United States Patent [19]

Sansone

[11] 3,709,117

[45] Jan. 9, 1973

[54] INFORMATION RECORDING METHOD AND SYSTEM

[75] Inventor: Ronald P. Sansone, Floral Park, N.Y.

[73] Assignee: Watson Leavenworth Kelton & Taggart, New York, N.Y.

[22] Filed: Oct. 12, 1970

[21] Appl. No.: 79,953

[52] U.S. Cl. ....................................95/4.5 R, 178/15

[51] Int. Cl. ..........................B41b 17/00, B41b 21/22

[58] Field of Search .....95/4.5 R; 178/15; 340/324 R, 340/324 A

[56] References Cited

UNITED STATES PATENTS

| | | | |
|---|---|---|---|
| 2,787,654 | 4/1957 | Peery | 95/4.5 |
| 3,141,395 | 7/1964 | O'Brien | 95/4.5 |
| 3,011,021 | 11/1961 | McNaney | 178/15 |
| 3,224,349 | 12/1965 | Schumann et al. | 178/15 X |

OTHER PUBLICATIONS

IBM Technical Disclosure Bulletin, Nonimpact Printer, Vol. 12, No. 3, August 1969

*Primary Examiner*—Robert P. Greiner
*Attorney*—Watson, Leavenworth & Kelton

[57] ABSTRACT

A photographic record of information contained in a sequence of data signals is provided by successive enabling of a generator providing visual images in a common optical path during time periods according with predetermined projecting relations between a cyclically movable reflector in such light path and a film member and operating such enabled generator upon coincidence of data signal information content and generator image-providing capability.

14 Claims, 4 Drawing Figures

INFORMATION RECORDING METHOD AND SYSTEM

BACKGROUND OF THE INVENTION

1. Field of the Invention

This invention relates to photographic recorders and more particularly to methods and systems providing for the sequential recordation of images in accordance with information defined by a succession of electrical signals.

2. Description of the Prior Art

Present day information recording and retrieval has been enhanced greatly by developments in data signal responsive photographic recorders adapted to provide a reproducible and miniaturized record of informational variants, such as alpha-numeric characters as defined, e.g., in the output signals of a digital computer or magnetic tape reader, without requiring the intermediate production of a reproducible document of conventional size such as is provided by computer print-out or like apparatus. In addition to the evident storage convenience and ease of reproduction of records provided by such recorders, recording time is substantially reduced as compared with print-out apparatus recording time, and hence computer-related recorders of this type, generally known as COM (computer-output-microfilm) recorders, have appeared in increasing numbers in recent years.

COM recording systems in general commercial use are of two types, both of which employ costly and complex electrostatic character image generators. In the CRT-type (cathode-ray tube) system, an entire record area, corresponding to a line or an entire page is exposed to the CRT face upon which a succession of character images are displayed, the images being formed by electron beams and so positioned on the CRT face by electrostatic deflection of the electron beams to be applied to particular recordation frames of the exposed record area. In the EBR-type (electron beam recorder) system, a like extensive record area is directly exposed in vacuo to image-defining electron beams which are electrostatically positioned as in the CRT-type system. The extremely high recording speed of both types of COM recorders readily permits "on-line" usage thereof, i.e. recording in direct response to computer output signals.

Whereas such commercial COM systems are bulky, complex in structure and of high cost, attributable in large part to inclusion of electron beam image generators, they have nevertheless satisfied present day recording demands and are in extensive practical use, such disadvantages apparently being compensated for by attainable recording speeds substantially greater than those attainable in other heretofore known simplified signal responsive photographic recorders employing comparatively inexpensive character image generators. Thus, no commercial COM recorder is presently known wherein recordable images are provided without use of electron beam apparatus, and by use of simplified image generators employing character image-bearing discs of the type used in photo-type composing recorders as shown, for example, in U. S. Pat. Nos. 2,787,654 and 3,059,219.

Whereas such simplified recorders have evident advantages over electron-beam recorders, particularly in terms of structural simplicity, cost and size, the operating characteristics thereof render them insufficient in recordation speed for COM and related usage. Thus, the image generators of such simplified recorders generate all required visual images in the same single output path and do not themselves have capacity for deflecting generated images to any one of a plurality of simultaneously exposed recordation frames. Thus, in contrast to the above-described entire record area exposure permitted in electron beam recorders, individual recordation frames are sequentially exposed to the single output path of these recorders through incrementally-stepped scanners which are intermittently moved upon completion of each image generation. This intermittent scanner movement results in undesired lengthening of recording time, and evidently restricts the field of application of these simplified recorders.

SUMMARY OF THE INVENTION

It is an object of the present invention to provide an improved signal responsive photographic recording system.

It is a further object of the invention to provide a signal responsive photographic recorder of the aforementioned simplified type adapted for efficient COM and related usage.

It is a more particular object of the invention to provide a signal responsive photographic recorder of the simplified type having improved recording speed capability.

It is an additional object of the invention to provide improved methods for use in signal responsive photographic recorders.

In brief summary thereof, the invention involves methods for providing a spaced succession of images on a record, such as photographic film, wherein an image reflector is provided with cyclic movement with respect to the record, e.g. is vibrated while the record remains in a fixed plane, thereby maintaining the reflector in projecting relation with a continuous lineal expanse of the record, inclusive of a plurality of recordation frames, during a portion of each cycle of reflector movement. Image generation is initiated upon detection of the commencement of such period of projecting relation and continued thereafter in accordance with reflector movement, images being applied to the reflector instantaneously upon generation thereof.

The invention further involves systems for recordation of images of informational variants defined by data signals, incorporating a visual image generator having capacity for generating images of all such variants and providing output signals indicative of the variant image which the generator is then capable of generating, a comparator providing indications of accord between the variant demands of the data signals and the instantaneous variant image generating capability of the generator, an image reflector maintained in cyclic image-projecting relation to the record and receiving generated images, a signal generator providing output signals indicative of reflector movement and coincidence circuit means adapted to excite the image generator in response to the comparator and signal generator output signals.

The foregoing and other objects and features of the invention will be evident from the following detailed description thereof and from the drawings.

DESCRIPTION OF THE PREFERRED EMBODIMENTS AND METHODS

Figure 1:
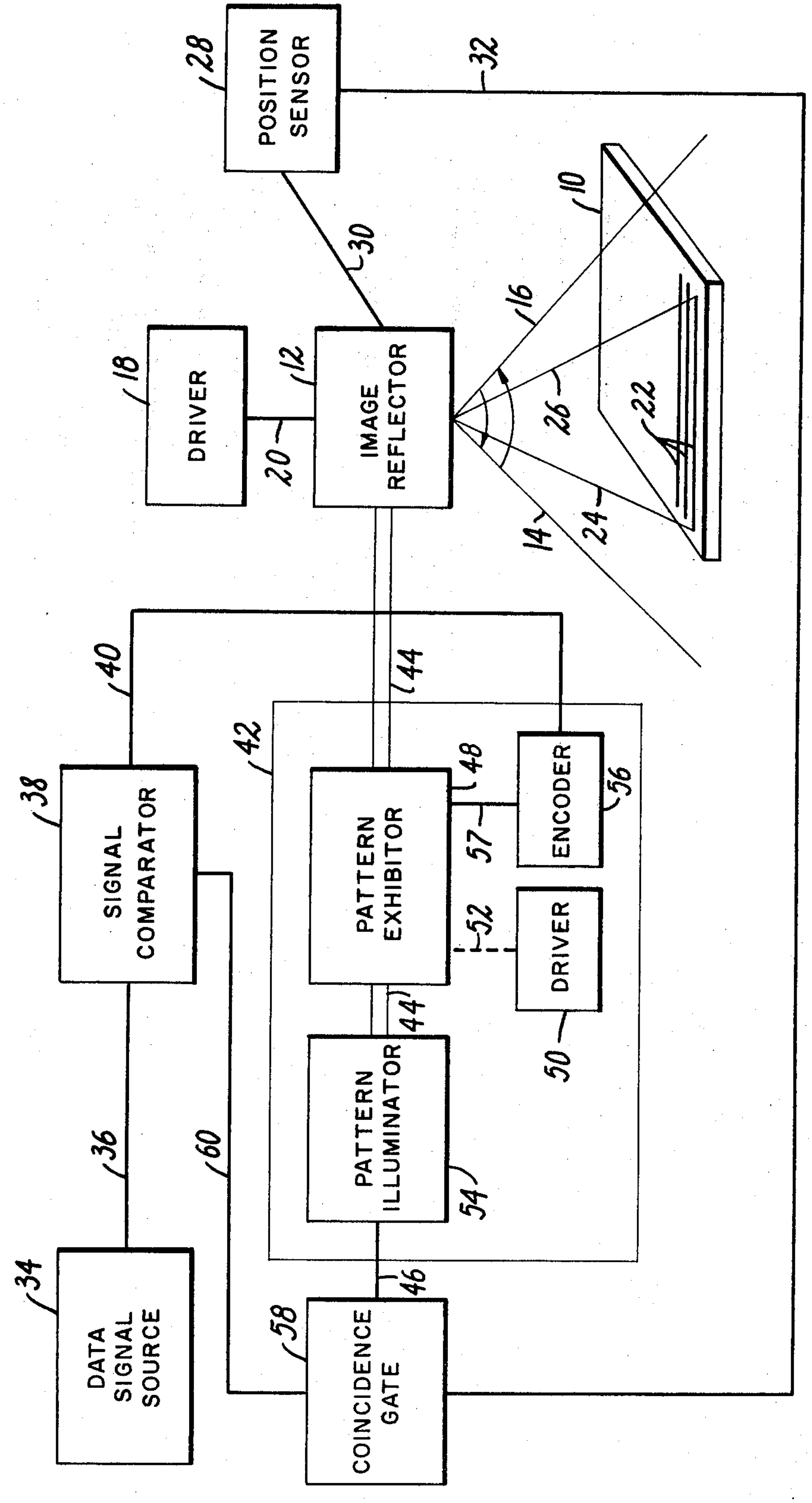
FIG. 1 is a schematic block diagram of one embodiment of a recording system in accordance with the invention.

Referring to FIG. 1, recording film 10 is disposed in the projecting zone of image reflector 12, such zone being defined by terminal paths 14 and 16 between which reflector 12 is maintained in continuous cyclic movement by drive means 18 through connection 20 as indicated by the directional arrows. Film 10 typically includes a recording area having successive lines or lineal expanses 22, and is adapted, upon exposure to image radiation and subsequent development, to provide permanent reproducible lines of spaced informational variants.

In accordance with the method herein, the recording area of film 10 receives images projected by reflector 12 during at least a portion of the movement cycle thereof, i.e., is exposed in a projecting subzone defined by paths 24 and 26. Thus, as reflector 12 sweeps from path 14 to 16, the reflector sweeps one of lineal expanses 22. As will be evident hereinafter, such arrangement permits relaxation of tolerances on the lateral extents of cyclic movement of reflector 12, terminal paths 14 and 16 being non-critical both as to position thereof and time of projection therein. The method herein requires only that reflector 12 be provided with continuous movement between lateral extents inclusive of the lineal expanse of the recording area of film 10. The method involves determination of the time at which reflector 12 is in image-projecting relation with path 24, i.e., the time of the commencement of the continuous sweep of each lineal expanse 22, and for this purpose, position sensor 28 is associated with reflector 12 through connection 20 and generates output signals on line 32 which are at least indicative of such sweep commencement and preferably are further indicative of movement of reflector 12 occurring thereafter.

Where drive means 18 provides reflector 12 with uniform movement, the method herein contemplates the further steps of generating informational variant images at uniformlyspaced intervals subsequent to such sweep commencement and of applying these images to reflector 12 instantaneously upon generation thereof. In this instance, the time expanse of the projecting subzone and the number of informational variant images per film line may be readily predetermined and the spacing interval may be predetermined by respective division thereof.

Alternatively and preferably, drive means 18 provides reflector 12 with simple movement, as by merely vibrating or oscillating the same, whereby reflector movement is generally non-uniform and subject to sporadic nonlinearity. In this instance, the method herein contemplates that position sensor 28 provide indication of both sweep commencement time and reflector movement thereafter. The preferred method thus contemplates the alternative further steps of generating informational image variant images, not necessarily at uniformly-spaced intervals after sweep commencement, but rather at discrete times selected in accordance with actual movement of reflector 12 after sweep commencement and of applying these images to reflector 12 instantaneously upon generation thereof.

In practicing the step of informational variant image generation, the method herein contemplates a responsiveness to the demands of data signals provided, for example, by a magnetic tape reader or the like. As will be discussed in connection with systems in accordance with the invention discussed below, this step is preferably implemented by use of a generator having a single image-generating path through which patterns of all informational variants are dynamically directed during the time period allotted for generation of each informational variant image. Alternative image generators may readily be incorporated such as, for example, those employing fixed informational variant patterns, each disposed in a separate image-generating path, such paths being optically combined in a single composite image-generating output path.

For providing multi-lined records, the method of the invention contemplates the step of advancing the record with respect to reflector 12 upon completion of the recordation of generated informational variant images constituting a complete line of information and then repeating practice of the sweep commencement detection and image-generating steps as described heretofore. The method herein will be further evident from the ensuing discussion of systems in accordance with the invention.

In FIG. 1, signals indicative of informational variants, e.g., alpha-numeric characters, to be recorded in particular sequence on film 10 are generated by data signal source 34 and are applied over line 36 to signal comparator 38. Source 34 output signals are typically arranged in successive groups, e.g., binary-encoded digital signals, each signal group being indicative of a single character. Comparator 38 provides continuous comparison of the line 36 signals and line 40 signals also applied thereto. These latter signals provide indication of the instantaneous character image-generating capacity of image generator 42 and comparator 38 generates output signals exclusively upon total correlation between the line 36 and line 40 signals, i.e., upon correlation between character demand and system capability for fulfilling such demand.

Image generator 42 provides its output to reflector 12 through path 44 in response to excitation signals on input line 46. The generator includes capacity for providing images of all characters which may be demanded by data signal source 34 and for this purpose includes pattern exhibitor 48, continuously operated upon by driver 50 through connection 52 to dispose a pattern of each character discretely within path 44 within a preselected time period. Generator 42 also incorporates pattern illuminator 54, responsive to line 46 signals to provide light pulses to path 44 for flash illumination thereof, and encoder 56, connected to pattern exhibitor 48 by line 57 and adapted to provide signals on line 40 indicative of the pattern then disposed by exhibitor 48 in path 44. Line 46 excitation of image generator 42 is controlled by coincidence gate 58, input signals to which are provided by signal comparator 38 and position sensor 28 on lines 60 and 32 respectively.

In explaining the operation of the FIG. 1 system, the "standby" mode thereof will be considered initially and thereafter the "record" mode will be discussed. In the standby mode, no character demand signals are provided on line 36, and in the absence thereof, signal comparator output line 60 is unexcited. Consequently, coincidence gate output line 46 does not provide excitation of generator 42 and pattern illuminator 54 thus provides no illumination of changing patterns continually disposed by exhibitor 48 in path 44. In such standby mode, encoder 56 provides signals on line 40 indicative of the instantaneous image-generating capacity of generator and position sensor 28 provides signals on line 32 indicative of commencements of the projecting subzone and movement of reflector 12 thereafter. The reflector is maintained in cyclic movement by driver 18 in the standby mode.

By way of example, let it be assumed that fifty character recordation frames are to be provided in each of record lineal expanses 22 of film 10. In this instance, sensor 28 provides signals on line 32 each time reflector 12 projects in path 24, such signals having time extents slightly less than the time period during which the reflector is in projecting relation with the first recordation frame, and like signals thereafter having time extents indicative of projecting relation between the reflector and subsequent recordation frames. These signals enable gate 58 and, during the time extent of each thereof, driver 50 operates exhibitor 48 at a rate such that all character patterns are successively disposed in path 44, i.e., such that the entire image-generating capacity of generator 42 is made available during the time extents of each such signal.

System operation shifts to the record mode upon the occurrence of character demand signals on line 36. Thereupon, comparator 38 is operative to provide the above-mentioned correlation between line 36 and line 40 signals. Line 60 is selectively excited upon total correlation between line 36 and line 40 signals and, where line 60 signals occur during the occurrence of the line 32 signal enable gate 58, line 46 is excited by gate 58. Thereupon illuminator 54 provides flash illumination of path 44 and instantaneously projects onto reflector 12 the image of the character pattern then disposed in path 44 by exhibitor 48, such generated image being applied by reflector 12 to the recordation frame of lineal expanse 22 then in projecting relationship with reflector 12.

By virtue of the respective operational speeds of the image-reflecting section, the image-generating section and the control signal-generating section of the FIG. 1 system, the system operates to enter information in each recordation frame of the lineal expanse swept by reflector 12 during each cycle of movement thereof. In this respect, indications by sensor 28 of projecting relationships between reflector 12 and recordation frames of film 10 occur at a relatively slow rate in comparison to the rate at which exhibitor 48 operates in disposing character patterns in path 44 and the rate at which comparator 38 effectuates signal correlation is substantially greater than the rate of operation of exhibitor 48.

Figure 2:
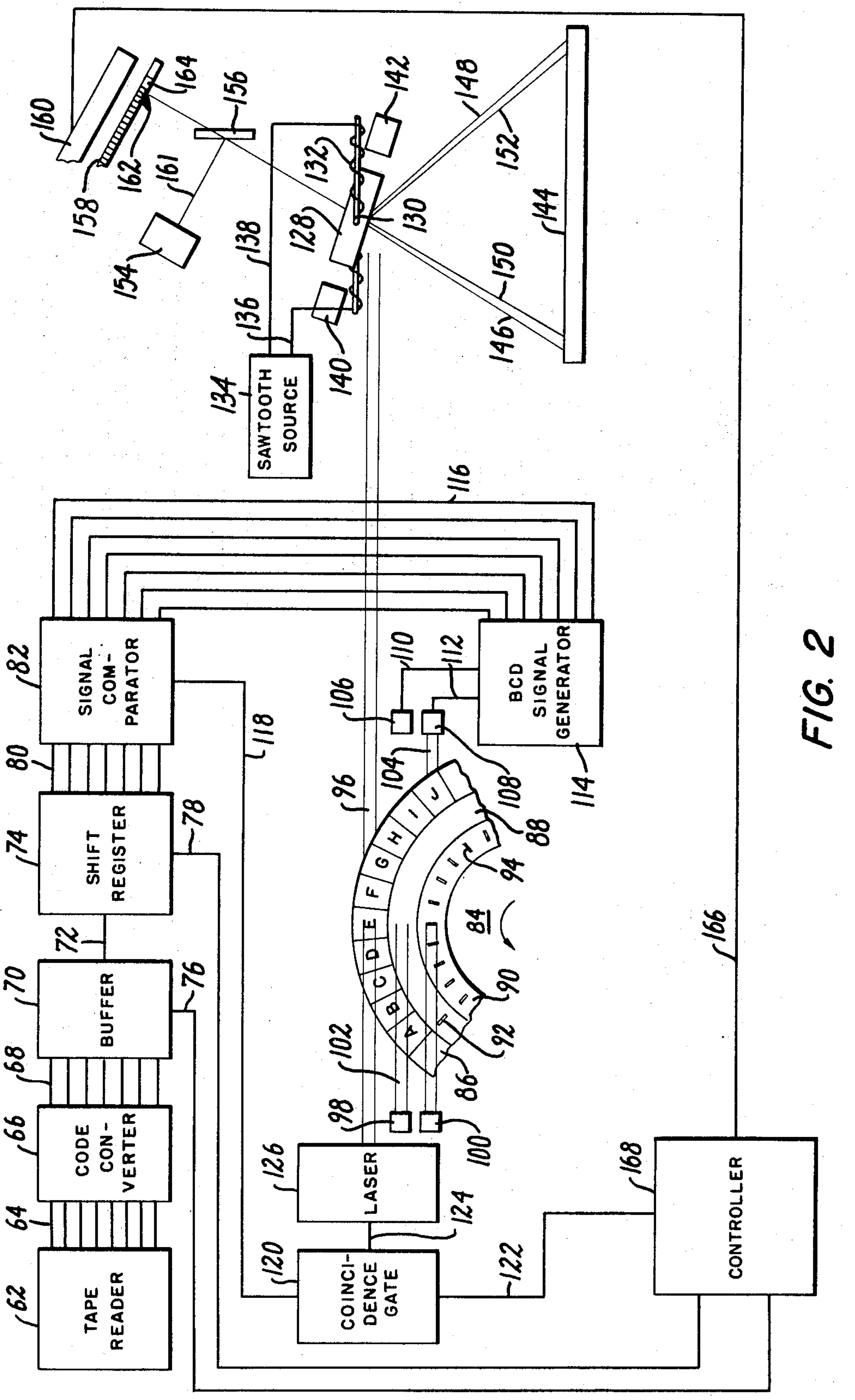
FIG. 2 is a schematic block diagram of another embodiment of a recording system in accordance with the invention.

In FIG. 2 the system of the invention is illustrated in its preferred form for COM and related usage, particularly in an "off-line" operation wherein input information is provided by tape reader 62. Typically such input information is in format comprising seven information bits and a parity or error-checking bit and is provided on the eight output lines 64 of the tape reader. For purposes of translating such coded information into suitable binary-encoded information for direct use in the system of the invention, lines 64 provide inputs to code converter 66 which in turn provides seven-line output information on lines 68. These signals are collected in buffer 70 and are read serially therethrough over line 72 into shift register 74 upon the occurrence of a buffer readout signal on line 76. Derivation of the line 76 signal will be discussed below. In accordance with the recording format desired, circuitry is provided in buffer 70 to provide a predetermined number of data signals to shift register 74 and the register has capacity exclusively for such predetermined number. Continuing the example discussed in connection with FIG. 1, if the recorded line is to contain fifty characters and each character is identified by a seven-bit signal, buffer 70 applies 50 seven-bit words to shift register 74 upon receipt of the buffer readout signal. Upon occurrence of a shift register advance signal on line 78, register 74 advances a single seven-bit word into its output stages whereby register output lines 80 apply a character definitive pulse pattern to signal comparator 82.

For purposes of exhibiting character patterns, the FIG. 2 system includes character disc 84 comprising an outer peripheral track 86, bearing alpha-numeric characters in translucent format against an opaque background, and identifier tracks 88 and 90. Track 88 bears a single translucent mark 92 against an otherwise entirely opaque background whereas track 90 includes translucent marks 94 in radial alignment with each of the reference characters on track 86. Light path 96 intersects track 86 so as to embrace no more than one reference character pattern at a time. Similarly, light sources 98 and 100 continuously illuminate light paths 102 and 104 respectively intersecting a single mark position of tracks 88 and 90. Detectors 106 and 108, e.g., photocells, are disposed in light paths 102 and 104 respectively for generation of signals on lines 110 and 112 indicative of dispositions of the translucent markings in light paths 102 and 104. By this arrangement, a substantially simplified manner of encoding signals indicative of the particular reference character disposed in light path 96 is accommodated. To this end, a binary-encoded decimal (BCD) signal generator 114 receives excitation from lines 110 and 112 and is adapted to be cleared of its preexisting contents by signals generated on line 110 and to be cumulatively stepped by signals generated on line 112. In operation thereof, as translucent mark 92 is disposed by disc rotation in light path 102, a signal is generated by detector 106 on line 110 and such signal clears generator 114 whereupon none of output lines 116 of the generator is excited. As indicated in FIG. 2, mark 92 immediately precedes entry of reference character A into light path 96. Since a continuous succession of translucent marks thereafter enters light path 104, generator stepping signals occur on line 112 in accordance with disc rotation and generator 114 is operatively responsive thereto to provide selective energization of generator output lines 116. For example, as the reference character A enters light path 96, the lowermost of lines 116 is exclusively excited. As reference character B next enters light path 96, the penultimate lowermost of lines 112 is exclusively excited, etc.

As lines 116 selectively change state as described, ultimate accord will be reached between the state thereof and the state of lines 80. Upon this occurrence, the pattern of the character identified in the output stages of shift register 74 resides in light path 96 and comparator 82 indicates such event by energization of line 118. Line 118 terminates in coincidence gate 120 and upon concurrent occurrence of such pulse on line 118 and a pulse on line 122, the coincidence gate energizes line 124 thereby pulsing laser 126. The laser thereupon provides flash illumination of light path 96, thus generating a visual image of the character then identified in the output stages of shift register 74.

The foregoing elements of the FIG. 2 system may be regarded as the system "input end" and it will be noted that such input end is dependent in its operation on signals provided thereto on lines 76, 78 and 122. These signals are derived from the system "output end," and the system may be characterized as output-dependent, thus permitting the scanning or output end of the system to override the input end of the system and to control system operation in fulfilling character demands. Such system characteristic enables continuous output end operation, i.e., permits the image reflector to sweep the record in non-intermittent manner, and conforms input end operation to image generation in accordance with instantaneous output end operation. System recording speed capability is accordingly improved as compared with heretoforediscussed known recording systems employing like simple character image generators but conforming record scanning operation in step manner to image generation.

Referring to the output end of the system of the invention, image reflector 128 is supported for oscillation about shaft 130. In a particularly preferred form, shaft 130 is comprised of a pair of taught fine wires insulated from an encircling armature winding 132. The armature winding is excited with current by sawtooth voltage source 134 through lines 136 and 138. The image reflector is provided with a magnetically-permeable backing or alternatively with an associated coaxial magnetically-permeable member disposed in the field of influence of stator magnets 140 and 142. Such arrangement provides for sustained and continuous oscillation of reflector 128 at the frequency of source 134. The image reflector is disposed in such image-projecting relation to film 144 as to project incident images in the projecting zone defined by terminal paths 146 and 148 inclusive of paths 150 and 152 which embrace the lineal expanse of the recording area of film 144.

The instantaneous position of reflective member 144 is continuously observed in the FIG. 2 system by an optical scan monitor comprising light source 154, beam splitter 156, grating 158 and photocell 160. The output of light source 154 is directed along path 161, is reflected by beam splitter 156 onto reflector 128 and is reflected thereby through beam splitter 156 to grating 158 and therethrough to photocell 160. Grating 158 is an opaque member containing uniformly-spaced light-transmissive slits 162 in number corresponding to the number of character recordation frames in the lineal expanse of film 144 and a further slit 164, the grating being disposed such that, upon counterclockwise rotation of reflective member 120, the rightmost of slits 162 is illuminated by source 154 at the instant reflective member 128 is in projecting relation with path 150. Whereas slits 162 are of recordation frame indicating nature, slit 164 is preferably of substantially greater width than slits 162 and is disposed rightwardly thereof for purposes of indicating the approach of projecting relation between the first recordation frame of film 144 and reflector 128.

Upon each energization of photocell 160, line 166 is pulsed thereby providing input information to controller 168. Controller 168 is adapted to provide three output signals respectively on lines 76, 78 and 122 in response to line 166 signals. In generating the line 76 signal controller 168 is operatively responsive exclusively to the high amplitude pulse provided on line 166 upon occurrence of illumination of slit 164, whereupon buffer 70 applies its contents to register 74. In such signal generation controller 168 may include any suitable amplitude-sensitive monostable circuit. Both of lines 76 and 78 are pulsed by controller 168 upon illumination of each of recordation frame-indicating slits 162 of grating 150. Controller 168 may implement this signal generation by amplitude-sensitive monostable circuits adapted to be unresponsive to the high amplitude line 166 pulse discussed above and adapted to be responsive to other pulses occurring on line 166. Line 78 pulses are applied to shift register 74 and constitute shift register advance signals whereby the shift register functions to present signals indicative of the next successive word contained therein on output lines 80. The line 122 signals are delayed slightly by controller 166 from the corresponding line 78 signals such that gate 120 does not pulse laser 126 prior to application of character demand signals by shift register 74 to comparator 82. Evidently, controller 168 may implement such selective generation of signals on lines 76, 78 and 122 in response to line 166 signals by use of frequency discriminating circuits.

Figure 3:
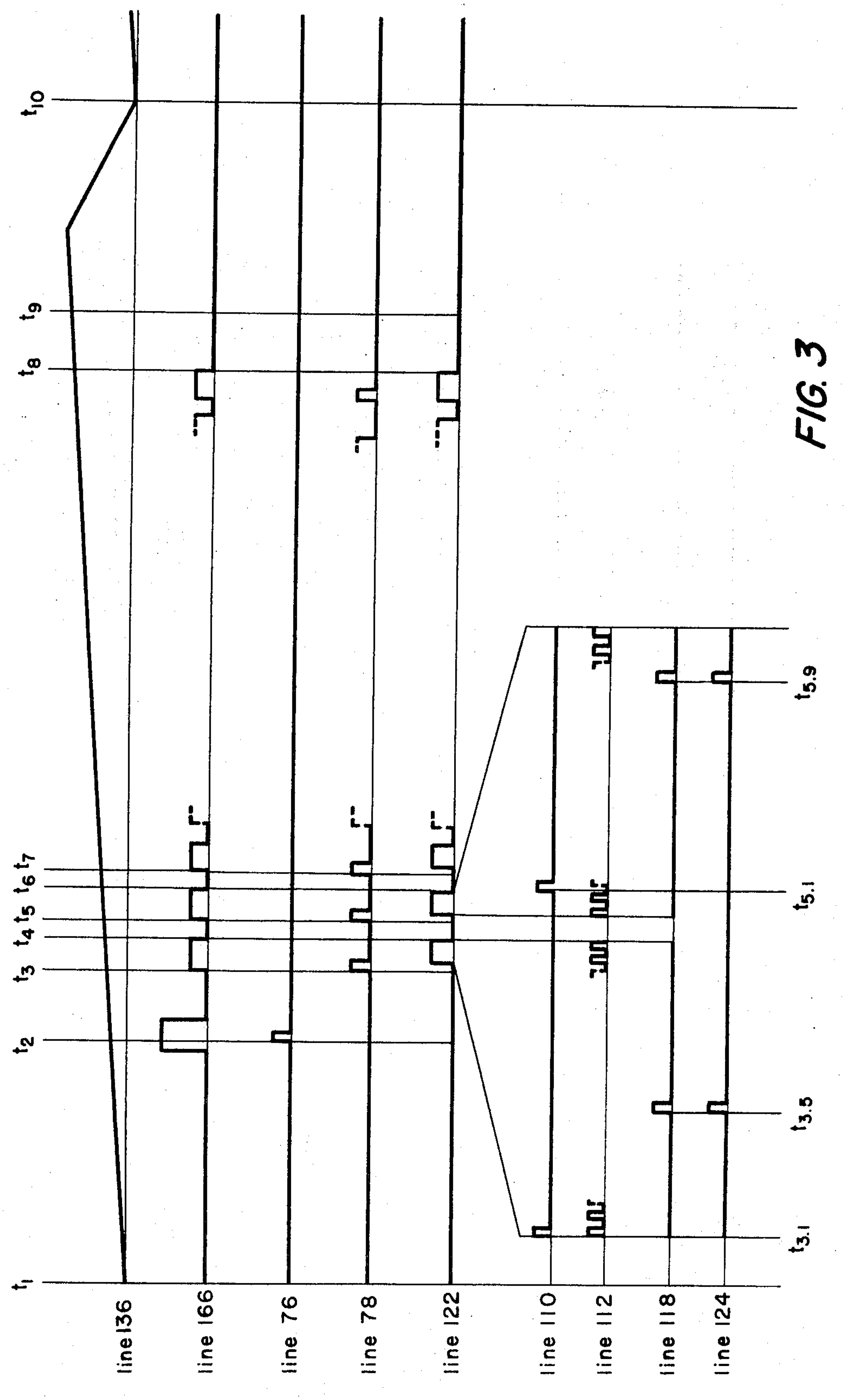
FIG. 3 is a graphical illustration of events occurring in the image-recording operation of the system of FIG. 2.

Further understanding of the operation of the FIG. 2 system will be evident by reference to the detailed timing diagram illustrated in FIG. 3. Therein one cycle of the sawtooth excitation of line 136 by source 134 is indicated as occurring during the time period $t_1 - t_{10}$. During such period and specifically during the period $t_2 - t_9$, reflector 128 projects in the zone defined by paths 146–148, path 146 being acted upon at time $t_2$ and path 148 being acted upon at time $t_9$. Interiorly of time period $t_2 - t_9$, i.e. from $t_3$ to $t_8$, reflector 128 projects in the subzone defined by paths 150152, path 150 being acted upon at $t_3$ and path 152 at $t_8$.

As is evident from the graphical indication of the state of line 166, photocell 160 is excited by illumination of slit 164 in the vicinity of $t_2$ to indicate the approach of recordation time period $t_3 - t_8$, as discussed above, and concurrently applies a high amplitude pulse to line 166 to provide the indicated buffer readout signal on line 76. Referring further to the line 166 indication in FIG. 3, the line is pulsed throughout time period $t_3 - t_8$ in accordance with the number of recordation frames of film 144, i.e. in accordance with the number of slits 162 in grating 158. Thus, reflective member 128 is in image-projecting relation with the first recordation frame during the period $t_3 - t_4$ and is in like relation to the second recordation frame during the period $t_5 - t_6$. Whereas successive recordation frames are adjacent and not relatively spaced, line 166 is unenergized during such time periods as $t_4 - t_5$ which intervene recordation frame indications by reason of the light-chopping action of grating 158. Lines 78 and 122 are pulses substantially in time relation with line 166 during the recordation period $t_3 - t_8$, the pulse train on line 122 being delayed slightly as discussed above with respect to the line 78 pulse train.

Whereas line 122 provides an enabling pulse to coincidence gate 120 upon occurrence of each recordation frame, e.g., at approximately $t_3$ and $t_5$, it will be observed that laser excitation line 124 is not pulsed precisely at either of these times, since line 118 is not pulsed at such time. On the other hand, line 118 and hence line 124 are indicated to be pulsed during these recordation time periods, e.g., at $t_{3.5}$ and at $t_{5.9}$.

During each of the recordation frame periods $t_3 - t_4$ and $t_5 - t_6$, all of the reference characters on disc 84 are successively disposed in light path 96 and, as indicated by the line 112 showing, pulses corresponding in number to the number of reference characters, are generated during each of said time periods. In addition, during these time periods line 110 is pulsed once, immediately prior to the time at which reference character A is disposed in light path 96. For purposes of explanation, it will first be assumed that line 110 is pulsed at $t_{3.1}$, substantially coincident with commencement of the first character recordation frame. In this instance, line 118 is pulsed at $t_{3.5}$, midway through the recordation frame time period, the time at which the pattern of the data signal demanded character, e.g. M, is then disposed in path 96 by disc 84. Upon instantaneous line 124 excitation an image thereof is applied to image reflective member 128. By way of further explanation, during the second recordation frame time period, it is presumed that the line 110 pulse occurs further within the time period, e.g. at $t_{5.1}$. Since line 118 indicates pulsing thereof at time $t_{5.9}$, a reference character pattern beyond character pattern M and then disposed in path 96 is determined to be the demanded character, e.g. U. As will be evident, no particular time relation is required for the pulsing of line 110 during the character recordation frame time periods since the demanded character will be disposed in light path 96 once during each such time period and may be projected onto the recording film at the beginning or end of such period without producing an observable visual disturbance in the record.

In FIG. 3, the pulses on line 166 are illustrated as being substantially equal in duration and relative spacing. Whereas such showing presumes uniform movement of reflector 128, the reflector may move with varying speed in sweeping film 144 without adversely affecting system performance since the system functions of generating images, of advancing the register to the next character demand and of introducing new character demands to the register are initiated only in response to particular reflector movements. In this respect, the system is output end dependent as discussed above and adaptive to output end performance aberrations.

Figure 4:
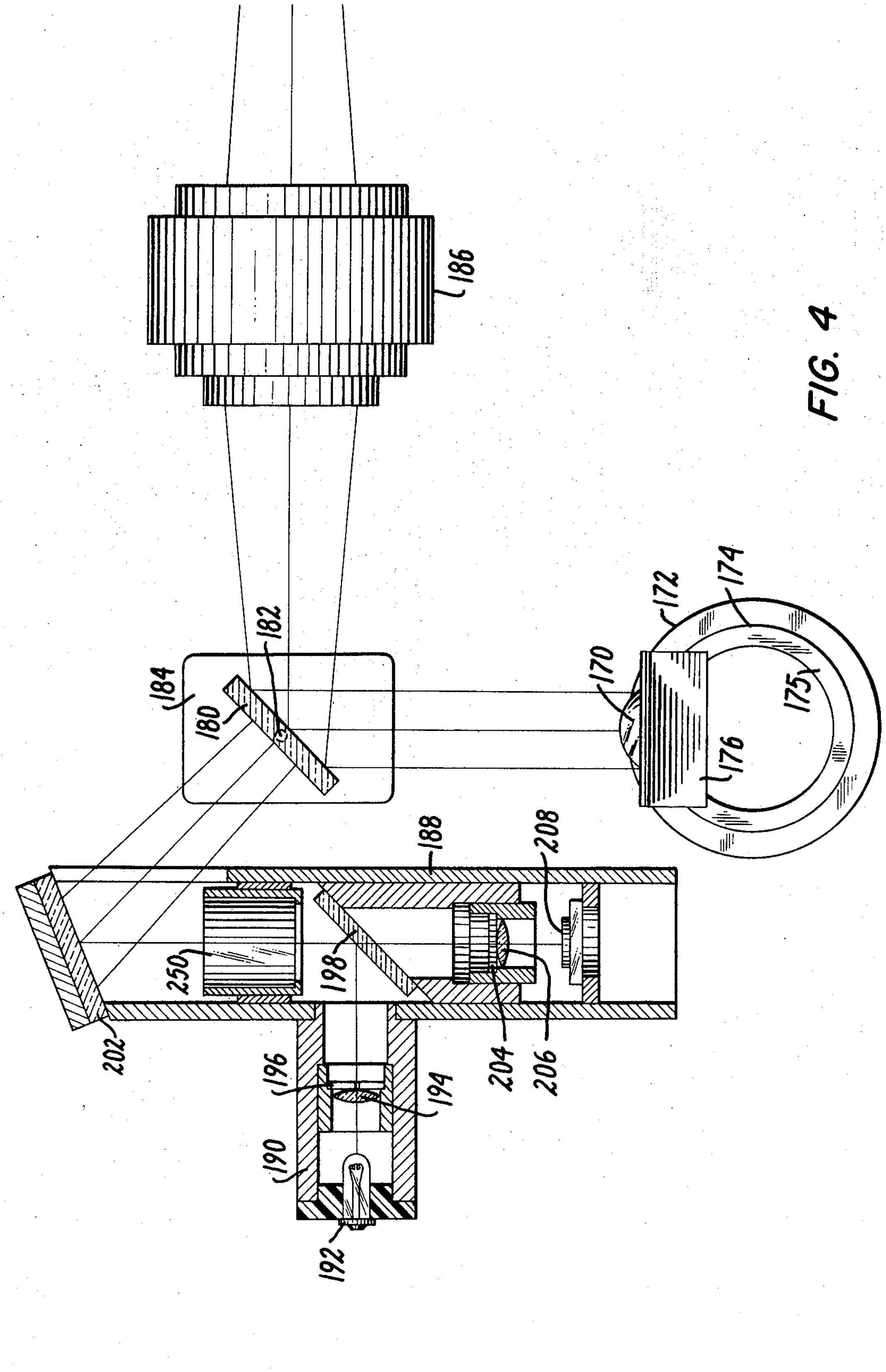
FIG. 4 is a side elevational view, partly in section, of apparatus suitable for practice of the invention.

A preferred arrangement of apparatus employed in practicing the invention is shown in side elevation in FIG. 4. Therein collimating lens 170 is disposed intermediate laser 172 and character disc 174, the latter having character pattern track 175. Light emanating from the laser and emerging with image pattern definition from the disc is reflected upwardly by inclined flat mirror 176 onto scanning mirror 180, affixed to shaft 182 of oscillatory driving mechanism 184, and thence through imaging lens 186 to the recording film.

Apparatus located leftwardly of scanning mirror 180 and integrally supported in tubular housings 188 and 190 monitors the instantaneous position thereof and includes lamp 192 the output of which is applied through condenser 194 and line reticle 196 to beam splitter 198 and thence to autocollimator 200. Flat mirror 202 applies the autocollimator output through a translucent housing portion to the scanning mirror and slit light reflected therefrom is returned through the autocollimator and beam splitter to grating 204 and thence through condenser 206 to photodetector 208.

Since various modifications of the foregoing preferred method and system embodiments of the invention will be evident to those skilled in the arts to which the invention pertains without departing from the spirit and scope of the invention, such illustrated embodiments are intended in a descriptive and not in a limiting sense. The true spirit and scope of the invention will be evident from the following claims.

What is claimed is:

1. A method for forming a succession of spaced images on a record comprising the steps of maintaining an image-reflective member in continuous cyclic movement with respect to said record and in image-projecting relation with a continuous lineal expanse of said record during at least a portion of each cycle of said movement, initiating generation of said images upon detection of the commencement of said portion of said movement cycle and thereafter in accordance with movement of said image-reflective member and applying said images to said reflective member instantaneously upon generation thereof.

2. The method claimed in claim 1 wherein said image-reflective member is provided with cyclic uniform movement with respect to said record and wherein the first image in said succession is generated upon said commencement detection and remaining images in said succession are generated thereafter at uniform time intervals.

3. The method claimed in claim 1 wherein the first image in said succession is generated upon said commencement detection and remaining images in said succession are generated thereafter upon predetermined movements of said image-reflective member.

4. The method claimed in claim 1 wherein said images are generated in accordance with informational variant demands defined in electrical signals.

5. A system for the recordation on a lineal expanse of a record of images of informational variants defined by data signals comprising:

a. means having capacity for discrete generation of a recordable image of each of said variants and providing output signals indicative of the instantaneous imagesgenerating capacity thereof;

b. comparator means selectively providing output signals upon coincident variant indication by said image-generating means output signals and said data signals;

c. an image reflector maintained in continuous movement with respect to said record and projecting generated images onto said record expanse;

d. signal generator means providing output signals upon predetermined movement of said reflector relative to said record; and e. coincidence circuit means operatively responsive to said comparator means output signals and said signal generator means output signals for selectively energizing said image-generating means.

6. The system claimed in claim 5 including drive means maintaining said reflector in cyclic movement, said signal generator means providing a first output signal upon occurrence of image-projecting relation between said reflector and the first recordation frame of said record expanse and further output signals upon subsequent predetermined reflector movement.

7. The system claimed in claim 6 wherein said signal generator comprises a light source, a photodetector and means continuously directing said light source output to said reflector and directing light source output reflected by said reflector onto said photodetector exclusively upon predetermined positionings of said reflector.

8. The system claimed in claim 7 wherein said light source output directing means comprises a beam splitter receiving said light source output and a grating intervening said beam splitter and said photodetector, said grating having light-transmitting slits according in minimum number with the number of recordation frames of said record expanse.

9. The system claimed in claim 5 wherein said image-generating means comprises first means energizable to illuminate an output light path thereof, second means providing a pattern of each of said informational variants, and third means adapted to operate said second means to individually dispose each of said patterns in said first means output light path within a predetermined time period.

10. The system claimed in claim 9 wherein said image-generating means further includes fourth means adapted to generate signals indicative of the informational variant pattern then disposed by said second means in said first means output light path, said signals constituting said image-generating means output signals.

11. The system claimed in claim 10 wherein said second means comprises a movable member bearing said informational variant patterns, a first sensible indicium adjacent each of said patterns and a single second sensible indicium, said fourth means including sensing means adapted to sense said first and second indicia and counting circuit means responsive to said sensing means to generate said image-generating means output signals.

12. The system claimed in claim 11 wherein said second means comprises a rotatable disc having a first circular track partly disposed in said first means output light path and bearing said informational variant patterns, a second circular track bearing said first indicia and a third circular track bearing said second indicium.

13. The system claimed in claim 9 wherein said first means comprises a pulsed laser.

14. The system claimed in claim 6 wherein said reflector drive means comprises a stator magnet, a magnetically permeable member supported for rotation about a shaft and disposed in the field of said stator magnet, an armature winding on said shaft, and means applying a cyclically-varying voltage to said winding.

* * * * *